US011625026B2

(12) United States Patent
Kiefer et al.

(10) Patent No.: US 11,625,026 B2
(45) Date of Patent: Apr. 11, 2023

(54) PRODUCTION SYSTEMS AND PRODUCTION CONTROL METHODS FOR CONTROLLING A PRODUCTION SYSTEM

(71) Applicant: TRUMPF Werkzeugmaschinen GmbH + Co. KG, Ditzingen (DE)

(72) Inventors: Manuel Kiefer, Sinsheim (DE); Benjamin Schwarz, Muenchingen (DE); Dennis Specht, Ludwigsburg (DE); Eberhard Wahl, Weilheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 410 days.

(21) Appl. No.: 16/807,848

(22) Filed: Mar. 3, 2020

(65) Prior Publication Data

US 2020/0201303 A1  Jun. 25, 2020

Related U.S. Application Data

(63) Continuation of application No. PCT/EP2018/071141, filed on Aug. 3, 2018.

(30) Foreign Application Priority Data

Sep. 5, 2017  (DE) .......................... 102017215613.9

(51) Int. Cl.
*G06F 7/00* (2006.01)
*G05B 19/418* (2006.01)
(Continued)

(52) U.S. Cl.
CPC ..... *G05B 19/41865* (2013.01); *B65G 65/005* (2013.01); *G01S 5/04* (2013.01);
(Continued)

(58) Field of Classification Search
CPC .......... G05B 19/41865; G05B 19/4183; B65G 65/005; G01S 5/04; G06Q 10/08; G06Q 10/087; G06Q 50/28; G06T 7/0004
(Continued)

(56) References Cited

U.S. PATENT DOCUMENTS

RE45,012 E  *  7/2014  Jones ..................... G06Q 10/06
                                                       177/136
2004/0100380 A1 *  5/2004  Lindsay ............. G06K 19/0717
                                                       340/572.1
(Continued)

FOREIGN PATENT DOCUMENTS

CN       104899714 A      9/2015
CN       105303346 A      2/2016
(Continued)

OTHER PUBLICATIONS

EP Office Action by European Appln. No. 18750419.6, dated Sep. 23, 2021, 8 pages (with English translation).
(Continued)

*Primary Examiner* — Yolanda R Cumbess
(74) *Attorney, Agent, or Firm* — Fish & Richardson P.C.

(57) ABSTRACT

A production system, the production system comprising the following: a loading zone for loading and/or unloading at least one collection carrier, a locating system for locating a collection carrier in the loading zone, the locating system being designed to determine the location of a mobile unit
(Continued)

arranged on the collection carrier and/or to capture identification information stored on the mobile unit, an image-capturing unit, which is designed to capture image information of the loading zone, an image evaluation unit, which is designed to determine the position of the collection carrier and/or a state of the collection carrier by the image information. A production control method for controlling a production system. The production system and the production control method enable improved order processing. Preparatory and/or follow-up tasks can be automated in a simpler and easier manner.

13 Claims, 2 Drawing Sheets

(51) Int. Cl.
| | | |
|---|---|---|
| G01S 5/04 | (2006.01) | |
| G06Q 10/087 | (2023.01) | |
| G06Q 50/28 | (2012.01) | |
| G06Q 10/08 | (2023.01) | |
| B65G 65/00 | (2006.01) | |
| G06T 7/00 | (2017.01) | |

(52) U.S. Cl.
CPC ......... *G05B 19/4183* (2013.01); *G06Q 10/08* (2013.01); *G06Q 10/087* (2013.01); *G06Q 50/28* (2013.01); *G06T 7/0004* (2013.01)

(58) Field of Classification Search
USPC .............. 414/788, 799, 795.4, 373; 700/213
See application file for complete search history.

(56) References Cited

U.S. PATENT DOCUMENTS

| | | | |
|---|---|---|---|
| 2004/0146602 A1* | 7/2004 | Garwood | B65D 81/2076 |
| | | | 426/35 |
| 2011/0277420 A1* | 11/2011 | Peters | B65G 17/20 |
| | | | 198/339.1 |
| 2017/0075346 A1 | 3/2017 | Oya et al. | |

FOREIGN PATENT DOCUMENTS

| | | |
|---|---|---|
| CN | 106651246 A | 5/2017 |
| DE | 102009060620 | 2/2012 |
| WO | WO 2016/082883 A1 | 6/2016 |

OTHER PUBLICATIONS

EP Office Action in European Appln. No. 18750419.6, dated Apr. 11, 2022, 10 pages (with English translation).
EP Office Action by European Appln. No. 18750419.6, dated Feb. 4, 2021, 14 pages (with English translation).
PCT International Search Report and Written Opinion in International Appln. No. PCT/EP2018/071141, dated Sep. 14, 2018.
Pozyx.io [online], "Pozyx Accurate Positioning", Available on Jul. 4, 2017, via Internet Archive: Wayback Machine URL <https://web.archive.org/web/20170704092444/https://www.pozyx.io/>, retrieved on Mar. 16, 2020, URL<https://www.pozyx.io/>, 6 pages.
Ray et al., "RFID-enabled real-time manufacturing execution system for mass-customization production," Robotics and Computer-Integrated Manufacturing, Sep. 2012, 29(2):283-292.
EP Office Action in European Appln. No. 18750419.6, dated Nov. 25, 2022, 10 pages (with English translation).
CN Office Action in Chinese Appln. No. 201880065183.1, dated Jan. 14, 2023, 18 pages (with English translation).

* cited by examiner

PRODUCTION SYSTEMS AND PRODUCTION CONTROL METHODS FOR CONTROLLING A PRODUCTION SYSTEM

CROSS REFERENCE TO RELATED APPLICATIONS

This application is a continuation of and claims priority under 35 U.S.C. § 120 from PCT Application No. PCT/EP2018/071141, filed on Aug. 3, 2018, which claims priority from German Application No. 10 2017 215 613.9, filed on Sep. 5, 2017. The entire contents of each of these priority applications are incorporated herein by reference.

TECHNICAL FIELD

The disclosure relates to production systems including a loading zone for loading and/or unloading of at least one collection carrier.

BACKGROUND

Manufacturing orders are usually processed in a production system. Such a manufacturing order may for example correspond to the manufacturing order to produce a predetermined number of one or more specific workpieces of the same form and type. In general, materials required for manufacturing are provided in collection carriers. Produced workpieces are collected in further collection carriers or workpiece collection carriers, for removal and being transported away.

To process a manufacturing order, a manufacturing program defined in advance generally needs to be carried out in the production system. Different manufacturing orders, for example in customized small orders, often require different manufacturing programs.

Required settings and adjustments of the production system to the respective manufacturing programs often result in considerable additional effort. Manual adjustments are frequently required.

For a manufacturing order, any required materials, tools and/or the like need to be provided in the loading zone. Suitable collection carriers need to be provided for the workpieces to be produced. The collection carriers need to at least have a sufficient free area for receiving the workpieces.

It is often necessary to search for manufacturing orders to be processed and the associated materials, which is why considerable losses of time and corresponding costs can sometimes also occur.

A materials logistics system for coordinating the transfer of production material is disclosed in WO 2016/082883 A1, for example.

SUMMARY

The systems and methods described herein can advantageously provide a production system and a production-control method by which the processing of a manufacturing order, in particular preparatory and follow-up tasks, can be carried out in a simplified, more cost-effective and more easily automated manner.

The production system includes a loading zone for loading and/or unloading at least one collection carrier, a positioning system for locating a collection carrier in the loading zone, wherein the positioning system is configured to determine the position of a mobile unit on the collection carrier and/or to detect identification information stored on the mobile unit, an image-recording unit that detects image information for the loading zone, and an image-analysis unit that determines the status of the collection carrier and/or a state of the collection carrier using the image information. An image recording unit does not necessarily record all image pixels simultaneously; they can be scanned as during ultrasound images are recorded, can be recorded using sensors such as pressure sensors, etc.

It is thus possible to locate a collection carrier, in particular positioned in the loading zone, by the position of the mobile unit assigned to the collection carrier being determined. In some embodiments, the positioning system may be configured to detect the position and the identification information. On the basis of the identification information, the mobile unit and thus the collection carrier assigned thereto can be identified. The mobile unit can thus form an (optionally indoor) tracking tag.

In addition, the situation (e.g., status) and/or the state of the collection carrier can be determined. Therefore, information is available that could not be obtained by the positioning system alone, or could only be obtained with a great deal of effort.

This information can be used to simplify preparatory and/or follow-up tasks in a manufacturing order. For example, the searching effort for a manufacturing order can be reduced by identification information for identifying the collection carriers required for the manufacturing order being derived from manufacturing-order data. On the basis of the identification numbers and the state, it can then be checked whether the collection carriers required for the manufacturing order including e.g., the required materials and/or tools are available and/or whether any required collection carriers, in particular workpiece collection carriers, are available or need to be booked.

The loading and/or unloading of the collection carrier can also be further simplified and improved if information regarding the state of the collection carrier is used.

The mobile unit may include a storage unit, in which the identification information, in particular a unique identification number and, e.g., predefined order information, can be stored and can be read out therefrom by the positioning system.

In this case, both individual production cells as well as larger production units, for example manufacturing lines or manufacturing facilities, can be considered to be a production system. In particular, the production system may also include a production region. The production region may include one or more processing machines and/or manual workstations. In a production system, in particular a production cell, the loading zone may be designated as a separate region. In particular in a larger production unit, paths, and/or open spaces that are adjacent to production regions, in particular between individual production regions, may for example also be provided as loading zones. Therefore, it is possible for the loading zone to include any locations at which a collection carrier can be positioned and/or for which a detection of the position and/or the situation and/or the state of the collection carrier is desired.

A collection carrier may in particular be a workpiece collection carrier or may include such a carrier. It may for example be a pallet or basket or may include such a pallet or basket.

The image-recording unit may be designed in different ways.

In some embodiments, the image-recording unit can be a camera. A camera can be easily installed on the production system or in the vicinity thereof and the image information can be directly analyzed. Production systems can thus also be retrofitted with such an image-recording unit and such a positioning system. The camera may be installed in a fixed manner or may be movable. It may also be used for other tasks, e.g., during unloading or loading or for safety purposes.

The image-recording unit can, however, also be in the form of an ultrasound sensor, in particular including an additional sound source.

The image information does not have to be overly detailed in every instance. In some circumstances, very highly pixelated image information is sufficient for recognizing a collection carrier. Therefore, the image-recording unit may, e.g., include pressure sensors and/or a light-barrier network on the loading zone, e.g., at a distance of from 5 to 25 cm. If it is known to the image-analysis unit that only a few standardized collection carriers having known dimensions are on the loading zone, high pixelation is sufficient.

The image-recording unit may, however, also consist of receiver units, which are designed to receive additional information that the mobile units transmit to the receiver units (e.g., via sound, light, in particular IR, Bluetooth, RFID, NFC, or similar communication interfaces). Using this information, the image-recording unit can ascertain which collection carriers are distributed in the loading zone, and in particular in which position. The image-analysis unit then establishes a connection between this information and the knowledge of the collection carrier dimensions and thus determines the situation of the collection carrier and/or its state.

Further configurations of image-recording units for determining image information for the loading zone are possible.

Generally, an image-recording unit is understood to be a recording unit that is designed to detect, in cooperation with the image-analysis unit, a) information that is sufficient to detect the situation of the collection carrier in the loading zone and/or b) the state of a collection carrier in the loading zone. An image-recording unit is understood to be a recording unit that is designed to produce, in cooperation with the image-analysis unit, a) an image of the loading zone that is sufficient to detect the situation of the collection carrier in the loading zone and/or b) the state of a collection carrier in the loading zone.

If a collection carrier is not present or a particular collection carrier to be positioned is not located in the region, in particular the loading zone, monitored by the positioning system, the positioning system can also be configured to detect predefined error and/or absence information as the position of this collection carrier.

A particularly advantageous embodiment results if the positioning system is a radio positioning system or includes such a radio positioning system. In particular, it may be an indoor radio positioning system. A radio positioning system can detect a plurality of mobile units virtually simultaneously, can position them spatially in high resolution and can identify and/or differentiate them. It can cover large areas or large spaces in a cost-effective manner. The mobile unit can be positioned in a contact-free manner and so as not to be perceived by an employee. For example, the employee is therefore not unnecessarily distracted from their work activities.

The mobile unit may be configured to reflect and/or emit radio signals adapted to the positioning system. The positioning system may include at least one transmitting and/or receiving unit configured to receive and analyze these signals. The positioning system, in particular the transmitting and/or receiving unit, may include one or more antennas. These may be distributed spatially to achieve particularly safe monitoring of the loading zone. The production system includes at least three transmitting and/or receiving units to locate the mobile unit by triangulation.

In particular, the positioning system may be an ultra-wide-band measuring system. An ultra-wide-band measuring system can operate with comparatively low transmission power. The positioning system, in particular the ultra-wide-band measuring system, can determine the position by trilateralization and/or by triangulation. One or more already known pieces of position information can be used as a starting point by the transmitting and/or receiving units of the positioning system.

The positioning system may be configured to detect the position of the collection carrier with an accuracy of less than 1 m, e.g., of less than 0.3 m. The positioning system can emit, receive and/or process signals having a particularly broad frequency spectrum, e.g., in the single-digit to double-digit gigahertz range. The signals may thus have particularly steep edges. As a result, the position can be particularly accurately determined. In practice, it has been found that such accuracy can particularly reduce the searching effort mentioned at the outset, for example. Therefore, it can not only be determined whether the collection carrier is in the loading zone, but also where it is in the zone.

The image-analysis units can also be designed to determine an actual loading state, a load factor, availability, non-availability, a position, a situation of a free area and/or a situation of a free space on the collection carrier as a status of the collection carrier. On the basis of the actual loading state, the system can thus determine whether or how the collection carrier is loaded. For example, the system can determine whether, and if yes, where, a sufficient free area is available on the collection carrier to receive workpieces to be produced. For example, the system can also determine whether the collection carrier is already completely full.

It may also be provided that the production system includes a loading device for loading and/or unloading the collection carrier. The loading device may in particular be designed for the automated or at least partially automated loading and/or unloading of the collection carrier.

The loading device may be configured to carry out a loading and/or unloading process depending on the situation and/or state of the collection carrier. For example, a produced workpiece or another object to be deposited on the collection carrier can be controlled depending on the position, the situation, in particular the orientation, of the collection carrier and/or the position and/or situation of a free area on the collection carrier. The loading and/or unloading process can thus be carried out with particularly high process reliability. The collection carrier can additionally be particularly efficiently loaded since, for example, a plurality of workpieces can be in a particularly tightly packed manner.

It is particularly advantageous for the production system to include a display and control unit, such as a touch-display unit. Information regarding a pending manufacturing order can thus be transmitted to the employee. The employees can input required data, for example data required for order processing, via the display and control unit. The data can then subsequently be used for production control.

It is also possible for the production system to include a central production management system. The production system can also be part of a larger production unit, the production unit then including a central production management system. The central production management system may for example be a management execution system (MES)

or may include such a system. The production system can thus exchange information with the central production management system or store information there and/or retrieve information therefrom. For example, the production system may obtain information regarding a manufacturing order to be processed. The production system can transmit determined information, for example regarding the position, situation, and/or state of the collection carrier, or regarding the success of a manufacturing step, to the central production management system.

The collection carrier can thus be managed over a plurality of production systems, for example.

The production system can include a sheet-metal processing system. Orders having a large number of order types, for example in the form of single orders and/or small orders, are often handled in sheet-metal processing systems. The effort mentioned at the outset for preparatory and/or follow-up tasks thus carries particular weight in sheet-metal processing systems, and therefore the advantages of production system become particularly apparent.

In another aspect, the production-control methods for controlling production systems can include:

A) detecting the position and/or identification information of a collection carrier by a positioning system;

B) determining the situation and/or state of the collection carrier by an image-recording unit and an image-analysis unit;

C) booking, removing, loading, and/or unloading the collection carrier depending on the detected position and/or the detected identification information, in particular depending on the situation and/or the determined state of the collection carrier.

Another method step/further method steps can be carried out before, after, and/or between the method steps (A), (B), and (C). For example, the method steps (A) and (B) can be carried out simultaneously or in any order.

The positions of the collection carrier, in particular within the loading zone, can thus be determined. On the basis of the identification information, the collection carrier can be identified. In addition, further information, in particular regarding the situation and/or the state of the collection carrier, can be detected. A collection carrier that is missing for a manufacturing order can thus be determined and booked or requested, for example. A collection carrier that is already full, for example, can be removed, for example transported on to a subsequent processing station. The collection carrier can also be loaded and/or unloaded. In this case, the booking, removing, loading, and/or unloading takes place depending on the detected position and/or the detected identification information. For example, the collection carrier can be loaded precisely and particularly efficient on the basis of the knowledge if its situation and state. In particular, the loading device can arrange produced workpieces on a free area of the collection carrier in a precise and space-saving manner.

Both the position and the identification information can be detected by the positioning system. It can thus be ensured that the collection carrier is positioned in a clearly identified manner.

Particularly precise positioning can be carried out by the positioning system. The information optically obtained by the image-recording unit and the image-analysis unit can supplement or complete the information that can be determined by the positioning system. It is particularly advantageous for the positioning system not to be designed optically, but as a radio positioning system, for example.

Previously routine manual inputs, e.g., regarding the position and situation of a collection carrier in the loading zone, can be omitted as a result.

In a particularly advantageous class of production-control methods, it is provided that an actual loading state, a load factor, availability, non-availability, a position, a situation of a free area and/or a situation of a free space on the collection carrier is determined as a status. For example, it can also be determined whether the collection carrier is already completely full and/or needs to be removed, in particular transported away.

A loading and/or unloading sequence can be automatically selected and/or adjusted depending on the actual loading state. One or more control programs can be stored in a storage unit of the production system. The control program(s) can then be retrieved depending on the actual loading state. The control programs may, for example, be configured depending on the type of manufacturing order. They may for example provide that certain workpieces are brought to, in particular deposited in, certain positions, in particular free spaces, on the collection carrier.

It is also possible for the loading and/or unloading sequence to be adapted to the extent that a collection carrier is automatically booked and/or is automatically removed from the production system.

Before processing an order in the production system, the information obtained in steps (A) and/or (B) can be compared with requirements of the order, in particular with identification information for required collection carriers, the position, situation, and/or the state thereof. For example, it can be checked in advance whether all the required collection carriers are available in the loading zone, whether all the required materials and tools are available, for example, and/or whether sufficient free space is available in one or more collection carriers for depositing the workpieces to be produced in the collection carrier(s).

It is also possible that information regarding the booking, removal, loading and/or unloading of the collection carrier of step (C) is transmitted to and/or received by a central production management system. For example, the success and/or lack of success of a working step, determined information such as the position of the collection carrier, its situation, and/or its state can be booked to a manufacturing order and/or a collection carrier, in particular to a collection carrier assigned to the manufacturing order, in the central production management system.

The processing of the manufacturing order can thus be monitored and/or controlled over a plurality of production systems, for example within one larger production unit and/or even over a plurality of operational facilities, which may be at large distances from one another.

It is possible for the central production management system to be part of a virtual computing center, for example, a cloud-based computing center, and to be arranged in a computing center available over a data interface and/or to be formed in such a computing center. For the management, required computing power can thus be dynamically adapted to respective present requirements. Interlinking the provided information with other participants involved in the processing and/or use of the manufacturing order can be facilitated. Previously unavailable production-process information or production-process information that was only available with difficulty can thus be made available to the participants and can be used thereby for further, overall reductions in costs and/or time.

Further features and advantages of the invention will become apparent from the following detailed description of an embodiment of the invention with reference to the figures of the drawings, which show details essential to the invention, and from the claims. The individual features can be implemented in variants of the invention either individually or in any combination.

DETAILED DESCRIPTION

Figure 1:
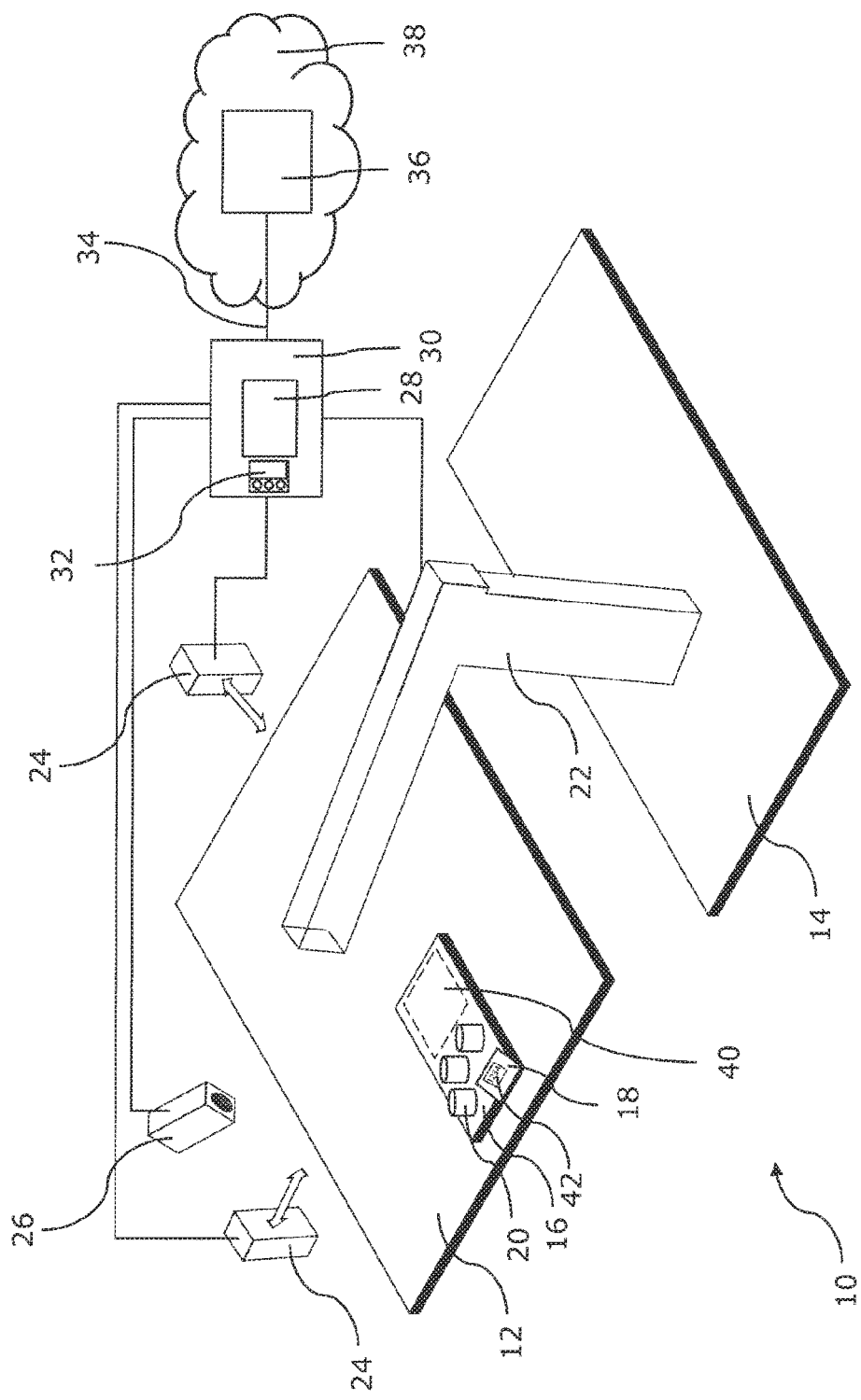
FIG. 1 is a schematic view of a production system as described herein.

FIG. 1 schematically shows a production system 10 or production cell that includes a loading zone 12 adjacent to a production region 14. A collection carrier 16 is located in the loading zone 12 (a pallet in this example) and a mobile unit 18 is fixed to the collection carrier 16. By determining the position of the mobile unit 18, the position of the collection carrier 16 can be determined.

Workpieces 20 that have already been produced are placed on the collection carrier 16. A loading device 22 is provided for loading and/or unloading the collection carrier 16 with workpieces 20. The loading device 22 is configured to move workpieces 20 from the collection carrier 16 into the production region 14 and back into the loading zone 12 and into the collection carrier 16.

A positioning system 24 includes a plurality of transmitting and receiving units, with two positioning systems 24 shown in FIG. 1. The positioning system 24 is configured to position mobile units 18 to determine the position thereof. By positioning the mobile unit 18, the position of the collection carrier 16 can thus be determined.

The positioning system is a radio positioning system, such as an ultra-wide-band measuring system. Accordingly, the positioning system 24 is capable of positioning the mobile unit 18 and the collection carrier 16 assigned thereto with a spatial resolution of less than 30 cm.

An image-recording unit 26, to which an image-analysis unit 28 is connected, is part of the production system 10. In this example, the image-recording unit 26 is a CCD camera. For simplicity, FIG. 1 shows one image-recording unit 26 but a plurality of image-recording units 26 can be provided. A plurality of image-recording units 26 can ensure that the loading zone 12 is completely optically scanned, and obstacles in the field of view of an image-recording unit 26 can be compensated for by the field of view or image from another image-recording unit 26.

The image-recording unit 26 and the image-analysis unit 28 are together configured to optically monitor the loading zone 12. The image-recording unit 26 and the image-analysis unit 28 are configured to determine the situation and an actual loading state of the collection carrier 16.

The image-analysis unit 28 is part of a control unit 30 that is a computing unit. The positioning system 24 and the image-recording unit 26 (via the image-analysis unit 28) are also in a data connection with the control unit 30. Both the information from the positioning system 24 and the optical information from the image-recording unit 26 or the information obtained therefrom by the image-analysis unit 28, in particular regarding the situation and the state of the collection carrier 16, are available in the control unit 30. For example, the collection carrier 16 includes a free area 40, which is recognized as such by the image-analysis unit 28. By the control unit 30, this information is combined with the information regarding the position of the collection carrier 16 provided by the positioning system 24, on the basis of identification information 42 on the mobile unit 18.

The mobile unit 18 includes a storage unit, in which the identification information 42, such as a unique identification number and predefined order information can be stored and can be read out therefrom by the positioning system 24. In this embodiment, this identification information 42 is additionally printed on the mobile unit 18 such that it can be read by an employee. The positioning system 24 is designed to also read out this identification information 42 from the mobile unit 18 or to request and receive the information from the mobile unit 18.

A display and control unit 32 is on the control unit 30 and includes a touch-display unit that displays production information to an employee and allows an employee to input additional data required for a manufacturing order.

The control unit 30 is also in a data connection with a central production management system 36 via a data interface 34, being a data network such as a wide area network (WAN). The central production management system 36 is part of a virtual computing center such as a cloud 38.

At least one computer program product is stored in an executable manner in the central production management system 36. This program product can be executed in the cloud 38 in operation. The computer program product is designed to manage and monitor a plurality of or all manufacturing orders to be processed. In some embodiments, one or more control programs, which are specifically tailored to different manufacturing orders or order types and are intended for the optimized control of loading and unloading processes, are stored in the central production management system 36 such that they can be retrieved, as explained in greater detail below.

Figure 2:
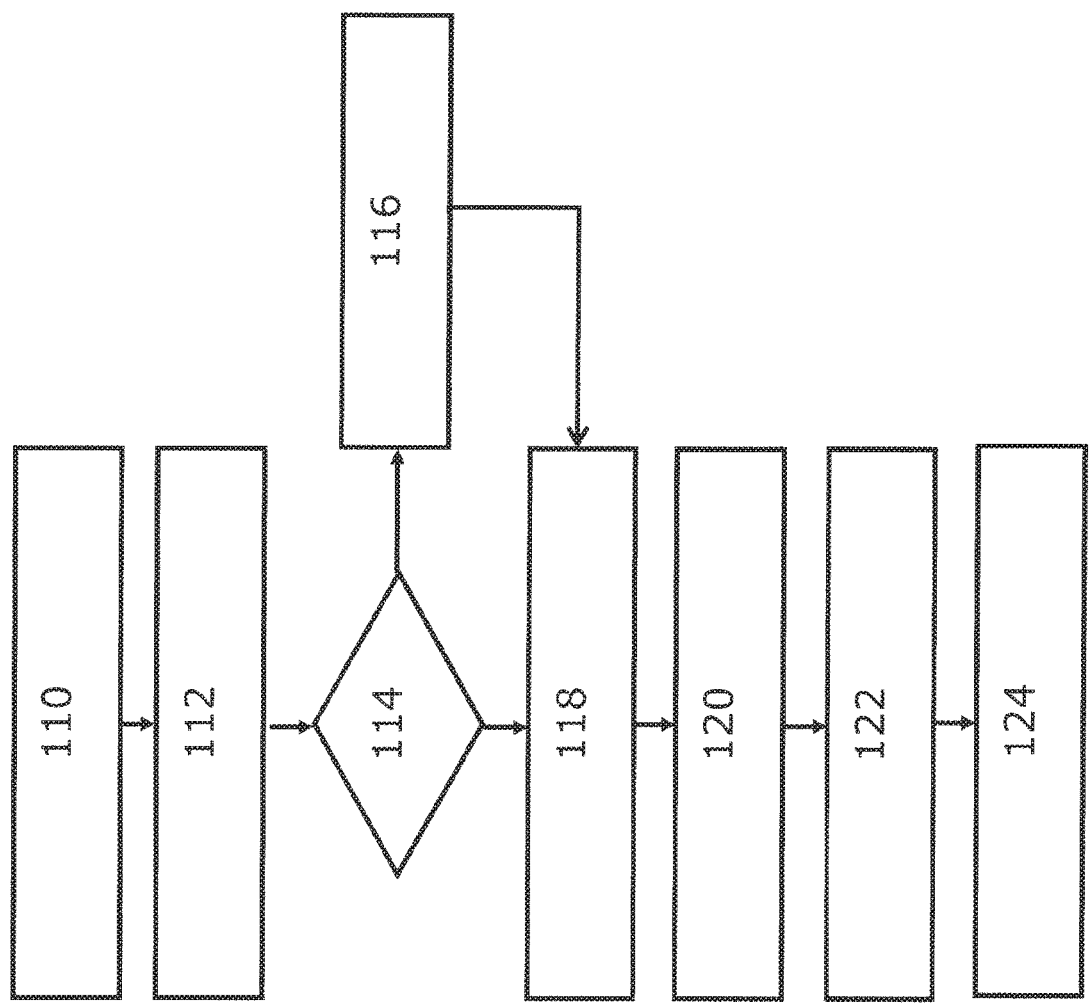
FIG. 2 is a flow chart of a method for using the production system of FIG. 1.

FIG. 2 schematically shows a production-control method 100 for controlling a production system corresponding to the production system 10 of FIG. 1. In a first step 110, the production system 10 and the collection carrier 16 are first prepared. This preparation includes the mobile unit 18 being assigned unique identification information 42 that is stored in the unit such that it can be retrieved. The collection carrier 16 thus can be uniquely identified. For control purposes, this identification information 42 can additionally be printed or displayed on the mobile unit 18.

This identification information 42 and all the information required for a manufacturing order are stored in the central production management system 36. If a plurality of manufacturing orders are stored, the central production management system 36 selects a manufacturing order to be processed and transmits the associated order data such as identification numbers of the collection carrier(s) 16 required for the order processing or of the mobile units 18 assigned thereto, to the control unit 30 via the data interface 34. In some embodiments, the central production management system 36 also transmits one or more specific control programs to the control unit 30, in which an optimized loading and/or unloading sequence or strategy is programmed for the manufacturing-order-specific control of the loading device 22. For the following description, for simplicity only the collection carrier 16 together with its mobile unit 18 are used.

The control unit 30 makes this information available to an employee for information and control by the output and control unit 32. The employee then starts the processing of the manufacturing order by actuating the output and control unit 32.

In a subsequent step 112, the positions and the identification information of all the collection carriers in the loading zone 12 and the identification information thereof are detected by the positioning system 24.

In a step 114, on the basis of this information it is checked whether all the collection carriers 16 required for the manufacturing order are located in the loading zone 12. The determined identification information is compared with the identification information stored in the manufacturing order.

If the collection carrier 16 (path marked by a minus in FIG. 2) is missing, it is booked in a step 116 and is provided in the loading zone 12 and its position is determined again if necessary. It can be provided by the employee or by an automatic transport system, which advantageously can be controlled by the control unit 30.

In a subsequent step 118, the situation of the collection carrier 16 and its actual loading state is then determined by the image-recording and image-analysis units 26, 28. It is determined how the collection carrier 16 is oriented relative to the loading zone 12 and where on the collection carrier required materials and workpieces 20 to be processed are deposited.

Depending on the position, the identification information 42, and the actual loading state, a suitable control program such as an unloading program is selected on the control unit 30 or is transmitted from the central production management system 36 to the control unit via the data interface 34, and is executed on the control unit 30. An unloading strategy specifically tailored to the manufacturing order and to the collection carrier 36 is stored in the control program, such that the loading device 22 precisely grips all the elements required for the manufacturing the workpieces 20, and efficiently transports them from the collection carrier 16 to the production region 14 on optimized transport paths and thus unloads the collection carrier 16 according to the manufacturing order with minimal time required. In this process, each individual transport instance of a workpiece 20 is reported to the central production management system 36 by the control unit 30 via the data interface 34 and is registered therein by the system.

In the following step 120, the workpieces 20 are processed in the production region 14 according to the order. The collection carrier 16 is then loaded with the processed workpieces 20 in a step 122.

For safety reasons, the position of the collection carrier 16 is first detected by the positioning system 24 and its position and current actual loading state are determined by the image-recording and image-analysis units 26, 28. Similarly to step 118, the loading device 22 is controlled by a loading program executed on the control unit 30, such that the collection carrier 16 is loaded with the workpieces 20 again. Likewise similarly, the workpieces 20 are individually booked out in the central production management system 36.

Once the loading is complete, the success of the processing step and the actual loading state is transmitted back from the control unit 30 to the central production management system 36 via the data interface 34. Therefore, at any point in time, a virtual portrayal of the current production situation in the production system 10 can be produced by the central production management system 36.

In a subsequent step 124, depending on the manufacturing order, the collection carrier 16 is brought to a downstream production system for further processing or—if the workpieces 20 are complete—is brought into a delivery warehouse for delivery.

In summary, described is a production system 10 and a production-control method 100 for controlling a production system 10, by which and in which, respectively, identification information 42 and/or a position is detected by a positioning system 24 and a situation and a state, such as an actual loading state, of a collection carrier 16 is determined by an image-recording unit 26 and an image-processing unit.

On the basis of combined processing of this information, the collection carrier 16 can be booked for processing a manufacturing order as required, can be loaded and/or unloaded, and after completion of the manufacturing order, can be removed from the production system 10. Previously required preparatory and/or follow-up tasks are thus reduced to a minimum or are avoided altogether. The production system 10 can be particularly flexibly and easily adapted to a wide range of types of manufacturing order by the quick detection of this individual information. The processing of the manufacturing order can be accelerated by the omission of previous sources of losses of time. This and other information relating to the manufacturing order can be stored and centrally managed in a central production management system 36. The level of automation of the production system 10 can thus be significantly increased in a simple manner.

By indoor positioning and an indoor positioning system 24, the positioning of the mobile unit 18 can take place solely by an analysis unit, e.g., without manual interaction. Previous systems for positioning workpieces or orders in manufacturing plants have the drawback that lost workpieces or orders have to be sought manually. It has been found that these manual searching processes in manufacturing plants having a high number of small, constantly changing orders, e.g., in job-order manufacturing plants, make up an extremely high proportion of the non-productive time. Using the positioning and the described system, the positions of the workpieces 20 and thus the orders can be called up, filtered, or located in a targeted manner on a screen, for example. The need for time-consuming manual processes searching for workpieces 20, but also for tools or persons, can thus be drastically reduced in (steel working and/or sheet-metal working) industrial manufacturing.

The concepts described herein are based on the use of a 2D/3D indoor positioning system as a starting point for location-dependent information processing. The positioning system 24, in particular the mobile units 18, may optionally be equipped with further sensor technology, for example with at least one acceleration and/or position sensor, and thus further act as a starting point for position-dependent information processing. This allows for location-dependent (and optionally position-dependent) interaction in the 2D/3D indoor positioning system during production or manufacturing control and allows manufacturing processes to be optimized. For example, virtual barriers (gates) and zones can be used to monitor and control a manufacturing process and downstream production steps in an automated manner. This can take place in real time.

The use of such positioning systems 24, when taking into account the expected processes in a manufacturing facility, is also possible in the specific environment of steel working and/or sheet-metal working industrial manufacturing. Accordingly, such positioning systems can be integrated in a manufacturing control system (also referred to herein as a production control system or manufacturing execution system (MES)). By taking into account the expected processes in a manufacturing facility, the use of such positioning systems 24 is possible despite the steel and sheet metal since metal workpieces 20 can reflect and shield the electromagnetic signals used. The systems can still be used even when the metal workpieces 20 are also moved in terms of their location, and the position and orientation of the reflection surfaces is thus constantly changing.

When using 2D/3D indoor positioning systems 24, a level of complexity may arise during the simple, dynamic allocation of obtained position information to physical components. The concepts disclosed herein address this complexity and make it possible, for example, to allocate production orders having an allocated identifier without the complex interaction of a mobile unit 18, by which the position information to be allocated is obtained.

Indoor positioning systems 24 allow material flows in the manufacturing within a manufacturing facility to be imaged in a detailed manner into the digital processing. The positioning systems 24 make it easier to locate the objects/persons involved in the manufacturing within the production environment. If tools, equipment, or carriers are initially equipped with a locatable mobile unit 18 of the positioning system 24, these can be accordingly allocated to digital information in a manual or automated manner in the digital control system. This also relates to objects that are temporarily involved in the manufacturing, such as production orders or service personnel. Temporarily required dynamic allocations may arise repeatedly, and are only required in the manufacturing facility for a few hours, days, or weeks. To facilitate and ensure the dynamic allocation of the mobile units 18 to new production orders in a simple and reliable manner, the process aids proposed herein can be used.

The indoor positioning can be carried out using the methods disclosed herein to an accuracy of less than 30 cm, e.g., less than 10 cm, in a manufacturing facility that cannot be reached by GPS satellite signals and has a floor area in the range of e.g., 1 hectare. This accuracy is essentially not possible with other technologies (Bluetooth, Wi-Fi, WLAN, infrared, mobile radio, or RFID). Many requirements need to be taken into account when positioning workpieces 20, orders, persons (e.g., operators) and/or tools. Industrial manufacturing is increasingly geared towards manufacturing small batches having many individual working steps (manufacturing processes such as cutting, bending, grinding, surface treatment) at different workstations, such as machine workstations and manual workstations. Therefore, several hundred different orders which all require different working steps often need to be handled in one day. Once just one disruption occurs, the manufacturing control can very quickly become very unclear. Semi-processed orders or orders that have not been processed at all are sought by individual persons in the manufacturing facility and the status thereof is ascertained, and this is time-consuming. This status is then transmitted to the manufacturing control. This can result in a considerable loss of time during the actual manufacturing.

Owing to the increasingly rapid processing steps during productive processing and as the number of different orders having increasingly small numbers of identical parts increases, such stoppages can occur increasingly frequently. The losses of time caused thereby reduce the productive time. If orders, workpieces 20, persons, e.g., operators, and tools are to be found rapidly, the positioning disclosed herein at least helps some of these units to reduce lost time. The positioning meets the very high requirements for industrial manufacturing.

Positioning in real time is the aim in industrial manufacturing; the positioning needs to be so accurate in terms of position that mobile units 18 can be reliably found and/or the processing steps can be reliably allocated. It has been become clear that positioning that is only accurate to 1 m is not sufficient for this purpose. Positioning which has to be re-calibrated every time the radiation behavior of electromagnetic waves changes, caused e.g., by movement of metal workpieces 20 in the manufacturing facility, is disadvantageous and often cannot be used. The positioning should also be flexible, it should be possible to combine several orders into one order, it should be possible to split one order into several orders, etc. The positioning should be simple to operate. It should be fail-safe.

In general, the concepts disclosed herein can make it possible to increase the process reliability, to optimize throughput times, and to accordingly optimize the production costs. Specifically, the concepts disclosed herein may bring about a significant time saving in the manufacturing process in some cases, the manufacturing process extending e.g., from the production of a required quantity of parts through to the correct transfer to a subsequent process (e.g., a subsequent metal-processing step). Several orders can further be implemented virtually simultaneously with high process reliability. The concepts disclosed herein further allow for simple allocation of workpieces 20 as part of the positioning system 24. Open orders can thus be optimized despite the complexity of several orders needing to be processed simultaneously.

It is possible to flexibly process different process sequences with the associated time saving if machines such as laser-cutting machines and/or punching machines are incorporated in the partially automated production process. The error prevention and the automatic, correct booking of workpieces 20, processing steps, etc., can form the basis for data-based real-time control of the metal processing (e.g., the steel and sheet-metal manufacturing). Accordingly, machine tools which are used when preparing small batch sizes of workpieces can accordingly also be integrated in manufacturing which is controlled by an MES as part of industry 4.0.

Aspects described herein are based in part on the knowledge that, with the accuracy and reliability of new positioning systems based on ultra-wide band (UWB) technology, for example having a position-determining accuracy of less than 30 cm, e.g., less than 10 cm, the use of indoor positioning systems is possible in a useful manner as part of industrial manufacturing.

The positioning systems that are described herein are intended for integration in industrial manufacturing are based on mobile units 18 (also referred to herein as "tags") and stationary transceivers (also referred to herein as "anchors"). During integration in industrial manufacturing, for determining the position of a workpiece 20, generally an object ("assets"), each of these is provided with at least one mobile unit 18 and is brought into a functional or spatial relationship with the unit (also referred to herein as a physical or spatial allocation). The mobile units 18 are generally electronic components which are capable of communicating with the transceivers, in particular by UWB communications technology. Each mobile unit can have its own time-determining unit ("clock") for establishing propagation times.

The positioning system 24 can include a plurality of transceiver units and at least one mobile unit 18. The positioning system 24 may further cooperate with the MES. For example, an analysis unit of the positioning system 24 may be designed as part of the MES.

The transceiver units can be configured to transmit UWB radio signals to the mobile units 18 and to receive UWB radio signals therefrom.

The distance between a spatially movable mobile unit 18 and a transceiver unit that is installed in a fixed manner can be determined by the time the signal requires to cover the distance between the two units. If the distances of several transceiver units are ascertained of which each of the positions are already known, the spatial position of the mobile unit 18 in relation to the transceiver units can be determined by triangulation, for example.

For determining a propagation time, the transceiver unit and the mobile unit(s) 18 can have highly accurate clocks that can accurately determine the time to a few nanoseconds or even to just fractions of a nanosecond. Even if the clocks in the transceiver unit and the mobile unit 18 are highly accurate, the clocks are not necessarily synchronized. Different methods for synchronizing clocks or eliminating errors can be used following from the asynchronous clock progression. For example, one of the transceiver units, e.g., acting as the master positioning unit, can thus transmit a signal at a first time T1 and a second signal at a second time T2. The time difference T2–T1 may be known to the mobile unit 18 or may be transmitted together with the signals, such that the unit can synchronize to the time of the transceiver units. Alternatively, the mobile unit 18 can transmit two signals in a known time interval Ta. In this case, the transceiver unit can ascertain the synchronization deviation on the basis of its own time measurement with its own clock from the reception of the first signal to the reception of the second signal and can calculate the deviation from the distance measurement. The time interval between the first signal and the second signal should be low so that the mobile unit 18 has not moved significantly in this time. The time interval can be selected by the mobile unit 18 such that it is a predetermined multiple or fraction of the time that the mobile unit 18 requires from the reception of a signal to which it should respond through to the output of the first signal.

The transceiver units can further be connected to the analysis unit by wireless or wired communication connections.

The mobile units 18 can for example only communicate via the transceiver units. Alternatively or additionally, the mobile units can independently communicate with the analysis unit/MES via other communication connections (for example a WLAN connection).

In general, the data communication of the transceiver units and the mobile units 18 with a manufacturing-control system, in particular with the MES, may be possible bidirectionally.

In some embodiments, WLAN transmitting stations may be integrated in the transceiver units of the positioning system for data access to the manufacturing-control system, such that digital data is accessible in the manufacturing facility via the transceiver units in a mobile manner, e.g., using smartphones or tablets. The integration of the WLAN transmitting stations in the transceiver units can simplify the installation and operation of a data-communication system in the manufacturing facility.

The UWB technology uses frequency ranges of, e.g., from 3 GHz to 5 GHz, the UWB technology using a relatively wide frequency range for forming signal curves (communications frameworks) that are strictly limited in terms of time. For it to be possible to namely locate an object that is transmitting radio waves as precisely as possible, a signal having very steep edges is required. This means that the signal has a rectangular signal curve over time rather than a sinusoidal curve. A signal is required in which a plurality of sinusoidal signals having different frequencies are superimposed. This is because a plurality of sinus signals having different frequencies can form a signal that has a steep edge and can approximate a substantially rectangular curve over time. This means that a plurality of frequencies from a wide-band frequency spectrum have to be available to form a signal. Accordingly, UWB technology, which has a wide-band frequency spectrum, is suitable for precise locating. The technology and the frequency bands that can be used in UWB technology are described in the "IEEE 802.15-2015" standard, for example.

An LED can be provided on the mobile unit 18 as an exposed element of the human-readable information. The LED may visually communicate coded information to the human by different colors, flashing frequencies or flashing patterns. A flashing LED is easier to recognize at long distances than a display, for example. Therefore, a signal device such as an LED has particular advantages if e.g., a mobile unit 18 is being sought. It can be addressed by an operator in a remote-controlled manner and can then be made noticeable by a signal device. Additionally or alternatively, it can output a noise signal. Such remote-controlled addressing can for example be carried out by another mobile unit 18 or via another, portable, device, e.g., a smartphone or tablet, or via the analysis unit. It can, however, also be carried out directly, e.g., via near-field sensors (e.g., Bluetooth, NFC, or IR).

The mobile unit 18 can further include individual sensors or several different sensors for ascertaining the position, the acceleration, the movement in space by a gyrosensor, the temperature, magnetic field, electrical field, humidity, brightness, sound, vibrations, etc. These may be used for additional functions.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A production system, comprising:
  a loading zone for loading and unloading of at least one collection carrier;
  a positioning system for locating the at least one collection carrier in the loading zone, wherein the positioning system is configured to:
    i. determine a position of a mobile unit on the collection carrier,
    ii. detect collection carrier identification information stored on a mobile unit on the collection carrier, or
    iii. both determine a position of a mobile unit on the collection carrier and detect collection carrier identification information stored on the mobile unit on the collection carrier;
  a loading device configured for: at least partially automated loading or unloading of workpieces onto or off of the at least one collection carrier, or both at least partially automated loading and unloading of workpieces onto or off of the at least one collection carrier;
  an image-recording unit that optically scans the loading zone to detect image information for the at least one collection carrier in the loading zone; and
  an image-analysis unit that determines both of:
    i. a position and orientation of the at least one collection carrier in the loading zone based on the optical scan, and ii. a state of the at least one collection carrier in the loading zone using the image information, wherein the state of the at least one collection carrier comprises any one or more of: an actual loading state, a load factor, availability, non-availability, a status of a free area, and a status of a free space on the collection carrier.

2. The production system of claim 1, wherein the positioning system comprises an ultra-wide-band measuring system.

3. The production system of claim 1, wherein the positioning system detects the position of the collection carrier with an accuracy of less than 1 meter.

4. The production system of claim 3, wherein the positioning system detects the position of the collection carrier with an accuracy of less than 0.3 meters.

5. The production system of claim 1, wherein the loading device carries out a loading or unloading process depending on the state of the collection carrier.

6. The production system of claim 1, further comprising a display and control unit.

7. The production system of claim 6, wherein the display and control unit comprises a touch-display unit.

8. The production system of claim 1, further comprising a central production management system.

9. The production system of claim 8, wherein the production system comprises a steel or sheet-metal processing system.

10. A method for controlling a production system, the method comprising:
    detecting one or both of: a position or identification information of a collection carrier via a positioning system;
    determining one or both of: a position or orientation of the collection carrier, and a state of the collection carrier via an image-recording unit configured to optically scan a loading zone to detect image information for the collection carrier in the loading zone, and via an image-analysis unit;
    booking, removing, loading, or unloading the collection carrier depending on one or both of the detected position and the detected identification information, and
    automatically selecting or adjusting a loading or unloading sequence depending on an actual loading state of the collection carrier;
    wherein the production system comprises:
        a loading zone for loading and unloading of the collection carrier,
        a positioning system for locating the collection carrier in the loading zone,
    wherein the positioning system is configured to:
        i. determine a position of a mobile unit on the collection carrier,
        ii. detect collection carrier identification information stored on a mobile unit on the collection carrier, or
        iii. both determine a position of a mobile unit on the collection carrier and detect collection carrier identification information stored on the mobile unit on the collection carrier,
    the image-recording unit, and
    the image-analysis unit, wherein the image-analysis unit determines both of: the position and orientation of the collection carrier, and a state of the collection carrier using the image information from the optical scan,
    wherein the state of the collection carrier comprises any one or more of: an actual loading state, a load factor, availability, non-availability, a status of a free area, and a status of a free space on the collection carrier.

11. The method of claim 10, wherein before processing an order in the production system, the information obtained in the detecting and determining steps is compared with requirements of the order.

12. The method of claim 11, wherein the requirements of the order include one or more of: identification information for required collection carriers, or the position, orientation, or the state of the required collection carriers.

13. The method of claim 10, wherein information regarding the booking, removal, loading and/or unloading of the collection carrier is transmitted to or received by a central production management system.

* * * * *